Dec. 10, 1935.     R. P. MOORE     2,024,055
MOTOR VEHICLE PEDAL
Filed July 27, 1933
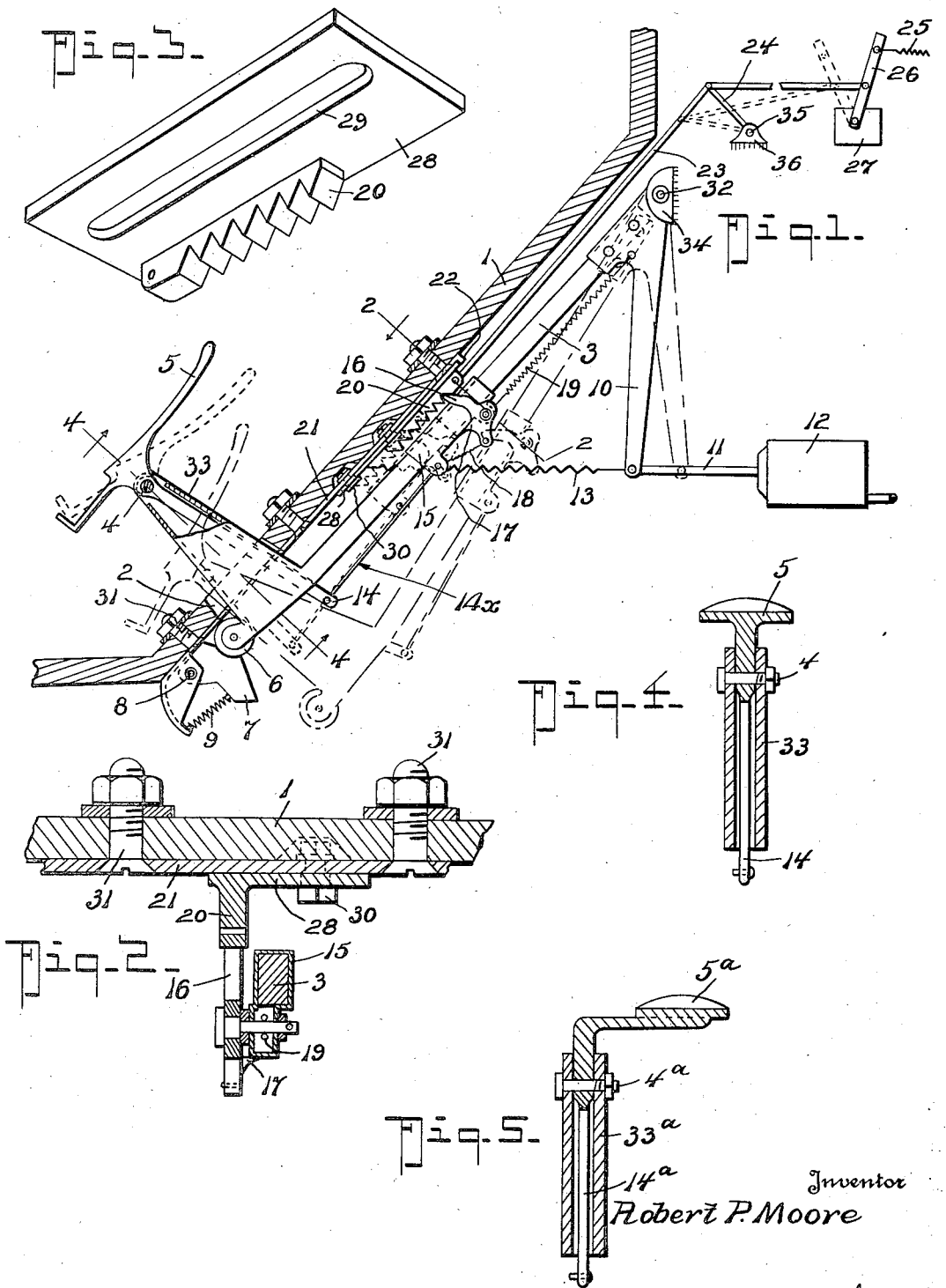
Inventor
Robert P. Moore
By Albert E. Dieterich
Attorney Patented Dec. 10, 1935

2,024,055

UNITED STATES PATENT OFFICE 2,024,055

MOTOR VEHICLE PEDAL

Robert P. Moore, Omaha, Nebr.

Application July 27, 1933, Serial No. 682,503

6 Claims. (Cl. 192—3)

This invention relates to certain new and useful improvements in motor vehicle pedals and has for its principal object an improvement in the combination of a brake and accelerator pedal.

Further it is an object to provide means for an instantaneous change from any degree of throttle-valve opening to a throttle-closed, brakes-applied condition.

Another object is to provide means whereby the throttle valve may be opened quickly upon release of the brake-applying pressure and without lateral movement of the foot.

Still further it is an object to provide a combination brake and accelerator pedal which assures constant control alertness with the minimum of muscular effort and operates according to natural impulses in emergencies, all of which promote safety and lessen the nervous strain of driving.

Other objects will in part be obvious and in part be pointed out hereinafter.

To the attainment of the aforesaid objects and ends, the invention still further resides in the novel details of construction combination and arrangement of parts, all of which will be first fully described in the following detailed description, then be particularly pointed out in the appended claims, reference being had to the accompanying drawing, in which:

Figure 1 is a side elevation of the invention showing the foot and floor boards in cross section.

Figure 2 is a detail section on the line 2—2 of Figure 1.

Figure 3 is a detail perspective view of the sliding rack.

Figure 4 is a detail section taken on the line 4—4 of Figure 1.

Figure 5 is a cross section similar to Figure 4 showing a modification of the invention hereinafter referred to.

In the drawing, in which like numerals of reference indicate like parts in all of the figures, 1 represents the foot board of a vehicle, having a cut-out portion 2 through which operates the tubular extension 33 of the brake applying lever 3.

4 represents the fulcrum of the brake pedal on which pivots the accelerator-brake pedal 5. The numeral 6 represents the brake detent engaging roller which engages with the brake detent 7 pivoted at 8 and held in engagement by the spring 9.

10 represents an extension of the brake applying lever 3 which is connected to the rod 11 that operates the brake piston within the cylinder 12, the said extension 10 having attached thereto a spring 13 which may be connected to the foot board 1 to act as a retractor for the brake arm 3.

14 represents the accelerator pedal which is connected to the pawl carrier by a rod 14x. The carrier 15 is slidably mounted on the brake applying lever 3. A spring 18 connects the carrier 15 with the pawl 16 so as always to tend to hold the pawl with its stop 17 against the carrier, the stop being provided to hold the pawl 16 against moving too far in one direction under the influence of the spring 18. A retracting spring 19 is connected to the pawl carrier and to the lever extension 10, the spring 19 serving continuously to pull the carrier 15 in a direction toward the fulcrum 32 of the lever 3 until stopped by engagement of the lever 14 with the wall of the tubular extension 33.

20 represents the sliding rack which is a part of the rack slide plate 28, the latter having a slot 29 and being held in place by stud bolts 30, the said stud bolts being bolted through the supporting plate 21.

22 represents the rack stop while 23 represents the throttle valve connecting rod operating via the guide 24.

The throttle valve lever 26 of the carburetor 27 has a closing spring 25.

31 represents the bolts holding plate 21 to support 1. 32 represents the pivot of lever 3 and 34 represents some suitable fixed support such as the engine block. 35 represents the pivot of 24 to a suitable fixed support 36.

In some cars the space under the foot board is restricted by the gear case so that it would be necessary to offset the portion of the pedal on which the driver's foot is applied, in order to make the position of the foot far enough toward the center to be comfortable and still permit the lever 3 to be located far enough from the center to pass the gear case or other obstructing parts of the vehicle. In such case the pedal 5a is offset to one side or the other, (right in Figure 5, for example). In that figure those parts which are the same as corresponding parts in Figure 4 have the same reference numeral plus the letter a.

It will be understood that the brake cylinder 12 is that of a hydraulic brake system. Pushing the pedal 5 bodily toward the floor board forces piston rod 11 inwardly and effects the application of the brakes. Reverse movement of the pedal 5 bodily from the floor board releases the brakes. Rocking motion of the pedal 5 operates the throttle lever 26 to open or close the throttle accordingly as the pedal is rocked one way or the other. The two actions, i. e., pushing the pedal toward the floor board and rocking the pedal, may be conducted separately or simultaneously as desired. Usually, however, the throttle valve is opened by rocking the pedal forward-downward by toe pressure while the brake arm 3—10 is in its normal unoperated position. This normal position is maintained against the weight of the driver's foot and pressure required to operate the throttle, mainly by the detent 7, and particularly by the spring 13.

The brakes are operated, as before indicated, by foot pressure to the entire pedal or its heel portion. This pressure overcomes the detent and spring resistance and causes the brake crank or arm 3 to move downward carrying the slidable member 15 and pawl 16 with it, and disengaging the pawl from the rack 20. This permits the throttle valve to close to the extent determined by the setting of any of the usual throttle controls under pressure of the usual throttle valve retracting spring (parts under normal pressure).

The brakes may be applied at any time without regard to the rocked position of the pedal and throttle valve and without shifting the foot laterally.

If the brakes are applied after the pedal has been rocked to the full limit and the throttle valve fully opened, and this rocked position of the pedal retained until the brake crank or arm is allowed to return to normal, the throttle valve will remain in its released and closed position until the pedal is allowed to return at least part way to its normal un-rocked position and again rocked to open the throttle valve. If the pedal is in an intermediate rocked position when the brakes are applied or is allowed to return only partially toward normal when the brakes are released, the pawl will be in engagement with an intermediate tooth of the rack and the throttle may be opened only to the extent of the remaining rocking range until the pedal is permitted to fully return to its normal un-rocked position. The throttle valve when released, i. e. when pawl 16 is disengaged from rack 20, is returned to its closed position by the spring 25.

This invention provides means for instantaneously changing from any degree of throttle valve opening to a throttle closed-brakes applied condition and vice versa, which in turn promotes safety and lessens the nervous strain and muscular effort.

Other advantages of the invention will be clear to those skilled in the art.

The drawing illustrates only the preferred arrangement of parts, and the invention is applicable to the operation of other types of brakes and to the control of power brake systems.

It will be understood that changes in the details of construction and arrangement of parts may be readily made without departing from the spirit of the invention and the appended claims.

From the foregoing description, taken in connection with the accompanying drawing, the complete construction, operation and advantages of my invention will be readily apparent to those skilled in the art.

What I claim is:

1. In motor vehicles having a throttle and a brake operating member; a pedal movably mounted on said member; a slide cooperatively connected with said throttle, a stationary support, means to mount said slide on said stationary support, a second slidable member carried by said operating member and movable therewith, means operatively connecting said pedal with said second slidable member to slide the same and means for operatively connecting said slidable members together.

2. In motor vehicles having a throttle and a brake operating member; a pedal movably mounted on said member, a slide cooperatively connected with said throttle, a stationary support, means to mount said slide on said stationary support, a second slidable member carried by said operating member and movable therewith, means operatively connecting said pedal with said second slidable member to slide the same and means for operatively connecting said slidable members together only while said brake operating member is in the brake "off" position.

3. In motor vehicles having a throttle lever, and a brake applying lever; means associated with the brake lever for actuation of the throttle lever; said means comprising a pedal rockably mounted on the brake lever, a rack member connected with the throttle lever, a stationary support, means to slidably mount said rack member on said stationary support, a slidably mounted pawl movable with the brake lever to engage with said rack member when the brake lever is in the brake-released position.

4. In motor vehicles having a throttle lever, and a brake applying lever. means associated with the brake lever for actuation of the throttle lever, said means comprising a pedal rockably mounted on the brake lever, a rack member connected with the throttle lever, a stationary support, means to slidably mount said rack member on said stationary support, a slidably mounted pawl movable with the brake lever to engage with said rack member when the brake lever is in the brake-released position, and means to detain the brake lever in the brake-released position while the pedal is being rocked to actuate the throttle lever.

5. In motor vehicles having a throttle lever and a brake applying lever; a pedal carried by the brake applying lever, a rack, means to slidably support said rack, cooperative connections between said rack and said throttle lever, a pawl cooperating with said rack and cooperatively connected with said pedal, and means to detain the brake lever in the brake-released position while the pedal is being rocked to actuate the throttle lever.

6. In motor vehicles having a throttle lever and a brake applying lever, with means continuously tending to hold the same in predetermined positions respectively; a releasable detent for detaining the brake applying lever in said predetermined position, said brake applying lever including a tubular extension, a pedal pivoted to said extension and having a lever passing through said tubular extension, a fixedly held mounting plate, a rack member, stud and slot connections for slidably mounting said rack member on said mounting plate, a sleeve slidable on said brake applying lever, a connecting rod between said pedal lever and said sleeve, means continuously tending to move said sleeve in one direction, a pawl carried by said sleeve to engage said rack while said brake applying lever is in its said predetermined position, and means connecting said rack with said throttle lever to operate the same when said pedal is worked.

ROBERT P. MOORE.